US008442509B2

(12) United States Patent  
Lee et al.

(10) Patent No.: US 8,442,509 B2  
(45) Date of Patent: *May 14, 2013

(54) SYSTEM AND METHOD FOR MANAGING A WIRELESS DEVICE FROM REMOVABLE MEDIA WITH PROCESSING CAPABILITY (75) Inventors: Kwang Wee Lee, Singapore (SG); Leandro Quitalig Galvez, Singapore (SG)

(73) Assignee: Cassis International Pte. Ltd., Singapore (SG)

( * ) Notice: Subject to any disclaimer, the term of this patent is extended or adjusted under 35 U.S.C. 154(b) by 701 days.

This patent is subject to a terminal disclaimer.

(21) Appl. No.: 12/386,208

(22) Filed: Apr. 14, 2009

(65) Prior Publication Data

US 2010/0197289 A1 Aug. 5, 2010

Related U.S. Application Data (60) Provisional application No. 61/206,454, filed on Jan. 30, 2009, provisional application No. 61/206,453, filed on Jan. 30, 2009, provisional application No. 61/206,427, filed on Jan. 30, 2009, provisional application No. 61/206,797, filed on Feb. 4, 2009.

(51) Int. Cl.  
*H04M 3/00* (2006.01)

(52) U.S. Cl.  
USPC ........... 455/419; 455/418; 455/558; 455/41.2

(58) Field of Classification Search .................. 455/418, 455/419, 558, 41.2  
See application file for complete search history.

(56) References Cited

U.S. PATENT DOCUMENTS

| 6,405,278 | B1 | 6/2002 | Liepe |
| 6,799,155 | B1 | 9/2004 | Lindemann et al. |
| 6,957,179 | B2 | 10/2005 | Debling |
| 7,031,903 | B2 | 4/2006 | Debling |
| 7,272,413 | B2 * | 9/2007 | Yu .............................. 455/552.1 |
| 7,454,233 | B2 * | 11/2008 | Lu et al. ........................ 455/558 |
| 8,032,182 | B2 * | 10/2011 | Bennett ......................... 455/558 |
| 2002/0049803 | A1 | 4/2002 | Bandhole et al. |
| 2002/0059542 | A1 | 5/2002 | Debling |

(Continued)

FOREIGN PATENT DOCUMENTS

| CN | 1 561 124 | 1/2005 |
| CN | 101132571 | 2/2008 |

(Continued)

OTHER PUBLICATIONS

Aug. 11, 2011 PCT International Premliminary Report on Patentability with Written Opinion for PCT/IB2010/000150.

(Continued)

*Primary Examiner* — Olumide T Ajibade Akonai  
(74) *Attorney, Agent, or Firm* — James R. Klaiber; Pryor Cashman LLP (57) ABSTRACT

Systems and methods for managing a wireless device from removable media with processing capability are described. One aspect may include a system for operating the radio hardware of a wireless device from a media device, comprising a media device, including a processor; a memory, coupled to said processor; and a radio host side peer layer, adapted to run on said memory and said processor, and adapted to communicate with the radio hardware of said wireless device.

59 Claims, 6 Drawing Sheets

U.S. PATENT DOCUMENTS

| | | | |
|---|---|---|---|
| 2002/0174337 | A1 | 11/2002 | Aihara |
| 2003/0043771 | A1 | 3/2003 | Mizutani et al. |
| 2003/0143988 | A1* | 7/2003 | Jamadagni .................. 455/418 |
| 2006/0190238 | A1 | 8/2006 | Autor et al. |
| 2007/0043550 | A1 | 2/2007 | Tzruya |
| 2007/0174033 | A1 | 7/2007 | Huang et al. |
| 2008/0146178 | A1* | 6/2008 | Lu et al. .................. 455/187.1 |
| 2008/0243465 | A1* | 10/2008 | Bohizic et al. ................. 703/23 |
| 2008/0320181 | A1 | 12/2008 | Lauterbach et al. |
| 2010/0194667 | A1 | 8/2010 | Lee et al. |
| 2010/0197289 | A1 | 8/2010 | Lee et al. |
| 2010/0197347 | A1 | 8/2010 | Lee |
| 2010/0198994 | A1 | 8/2010 | Lee |
| 2010/0199008 | A1 | 8/2010 | Lee et al. |

FOREIGN PATENT DOCUMENTS

| | | |
|---|---|---|
| DE | 199 35 888 | 2/2000 |
| DE | 20 2004 020 819 | 5/2006 |
| EP | 0 994 614 | 4/2000 |
| EP | 1 450 516 | 8/2004 |
| EP | 1 460 820 | 9/2004 |
| FR | 2 854 261 | 10/2004 |
| GB | 2 317 246 | 3/1998 |
| GB | 2 450 570 | 12/2008 |
| JP | 2007251630 | 9/2007 |
| WO | WO 2008/011727 | 1/2008 |
| WO | WO 2010/086711 | 8/2010 |
| WO | WO 2010/086712 | 8/2010 |
| WO | WO 2010/086714 | 8/2010 |
| WO | WO 2010/086731 | 8/2010 |

OTHER PUBLICATIONS

Aug. 11, 2011 PCT International Premliminary Report on Patentability with Written Opinion for PCT/IB2010/000177.
Aug. 11, 2011 PCT International Premliminary Report on Patentabilitywith Written Opinion for PCT/IB2010/000151.
Aug. 11, 2011 PCT International Premliminary Report on Patentabilitywith Written Opinion for PCT/IB2010/000153.
Oct. 27, 2011 PCT International Premliminary Report on Patentabilitywith Written Opinion for PCT/IB2010/000684.
U.S. Appl. No. 12/386,211, filed Apr. 14, 2009, Lee, et al.
U.S. Appl. No. 12/386,212, filed Apr. 14, 2009, Lee.
U.S. Appl. No. 12/386,213, filed Apr. 14, 2009, Lee.
U.S. Appl. No. 12/386,210, filed Apr. 14, 2009, Lee, et al.
U.S. Appl. No. 61/206,454, Lee et al.
U.S. Appl. No. 12/386,211, filed Aug. 5, 2010, Lee et al.
U.S. Appl. No. 51/206,453, Lee.
U.S. Appl. No. 12/386,212, filed Aug. 5, 2010, Lee.
U.S. Appl. No. 61/206,427, Lee et al.
U.S. Appl. No. 12/386,208, filed Aug. 5, 2010, Lee et al.
U.S. Appl. No. 61/206,797, Lee.
U.S. Appl. No. 12/386,213, filed Aug. 5, 2010, Lee.
U.S. Appl. No. 12/386,210, filed Aug. 5, 2010, Lee et al.
U.S. Appl. No. 12/660,723, Lee.
Feb. 16, 2010 Martyn Williams, "SK Telecom Crams Android, Processor Inside a SIM Card", PC World.
Feb. 17, 2010 IDG News Service, "Prototype SIM Card Holds Processor, Memory, Storage and the Android OS", PC World.
Jul. 8, 2010 International Search Report and Written Opinion, for PCT/IB2010/000177.
Jul. 8, 2010 International Search Report and Written Opinion, for PCT/IB2010/000153.
Jul. 8, 2010 International Search Report and Written Opinion, for PCT/IB2010/000684.
Jul. 12, 2010 Invitation to Pay Additional Fees, and Partial International Search, for PCT/IB2010/000150.
Jul. 12, 2010 Invitation to Pay Additional Fees, and Partial International Search, for PCT/IB2010/000151.

* cited by examiner

PRIOR ART

SYSTEM AND METHOD FOR MANAGING A WIRELESS DEVICE FROM REMOVABLE MEDIA WITH PROCESSING CAPABILITY

CROSS-REFERENCE TO RELATED APPLICATIONS

This application claims priority to U.S. Provisional Patent Applications Ser. Nos. 61/206,454, 61/206,453, and 61/206,427, filed Jan. 30, 2009, and U.S. Provisional Patent Application Ser. No. 61/206,797, filed Feb. 4, 2009, the disclosures of which are incorporated herein by reference.

FIELD OF THE INVENTION

The present invention relates to a system and method for managing a wireless device from removable media with processing capability.

BACKGROUND OF THE INVENTION

Current wireless device designs function with all the software layers residing in the handset, utilizing the main processor and attached radio hardware. The application and runtime environments are dependent on the hardware architecture of each specific handset. User applications and run-time environments on each handset lose portability and compatibility if the user were to change to a handset with some hardware architecture changes.

It may be desirable to have a system and method for managing a wireless device from removable media with processing capability. This makes the runtime environment and application independent of the wireless radio hardware that is implemented on the wireless handset. The removable media with the processor and installed software can be connected to any other wireless handset with a different wireless radio hardware configuration and still function properly.

SUMMARY OF THE INVENTION

Embodiments of the present invention may provide a method and system that may include a remote processor package housed in removable media accessing a wireless radio modem in a wireless device, wherein the access takes place via a communication link. In one aspect, the present invention may provide for a remote processor package system housed in removable media.

One aspect may include a system for operating the radio hardware of a wireless device from a media device, comprising a media device, including a processor; a memory, coupled to said processor; and a radio host side peer layer, adapted to run on said memory and said processor, and adapted to communicate with the radio hardware of said wireless device. Another aspect may include a method for operating the radio hardware of a wireless device from a media device comprising emulating, on the media device, a hardware interface that a runtime environment will communicate with; mapping, on the media device, the radio hardware of the wireless device using a radio API so the runtime environment and an application operate as if directly connected to hardware, via a radio host side peer layer; and executing the application and runtime environment on the radio hardware as if the hardware is directly connected to the media device. Another aspect may include a system for operating the radio hardware of a wireless device from a media device, comprising a wireless device, including a processor; a memory, coupled to said processor; radio hardware, coupled to said processor; and a radio API, adapted to run on said memory and said processor, adapted to communicate with said radio hardware of said wireless device, and adapted to communicate with the media device.

BRIEF DESCRIPTION OF THE DRAWINGS

Features and other aspects of embodiments of the present invention are explained in the following description taking in conjunction with the accompanying drawings, wherein.

DETAILED DESCRIPTION

Various embodiments of the present invention will now be described in greater detail with reference to the drawings.

Figure 1:
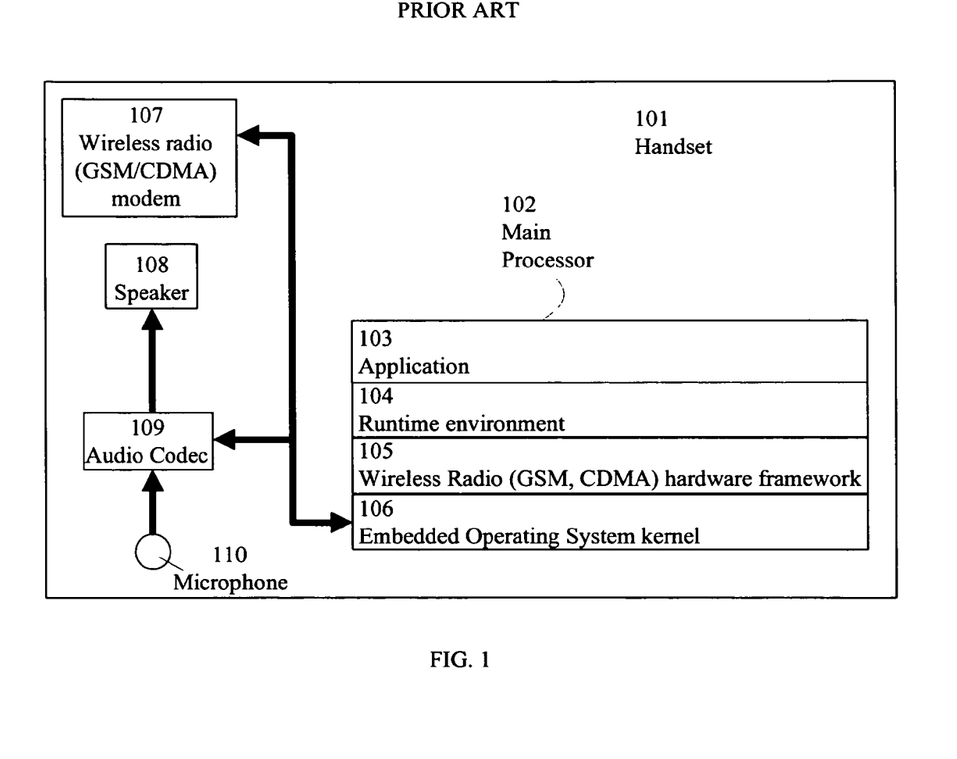
FIG. 1 illustrates a radio modem control block diagram for a typical wireless handset.

As shown in FIG. 1, typical architecture for a wireless handset 101 includes a processor 102 located in the handset. The current wireless handset design 101 has all the software layers stored in the handset, using the main processor and attached radio hardware 107. Current wireless handset design 101 includes the software layers for the application 103, the runtime environment 104, the wireless radio hardware framework 105, and the embedded operating system kernel 106 located entirely in the wireless handset 101. Additionally, current wireless handset design 101 includes a microphone 110 connected to an audio codec 109, which is connected to the main processor 102. The audio codec 109 is then connected to the speaker 108.

Figure 2:
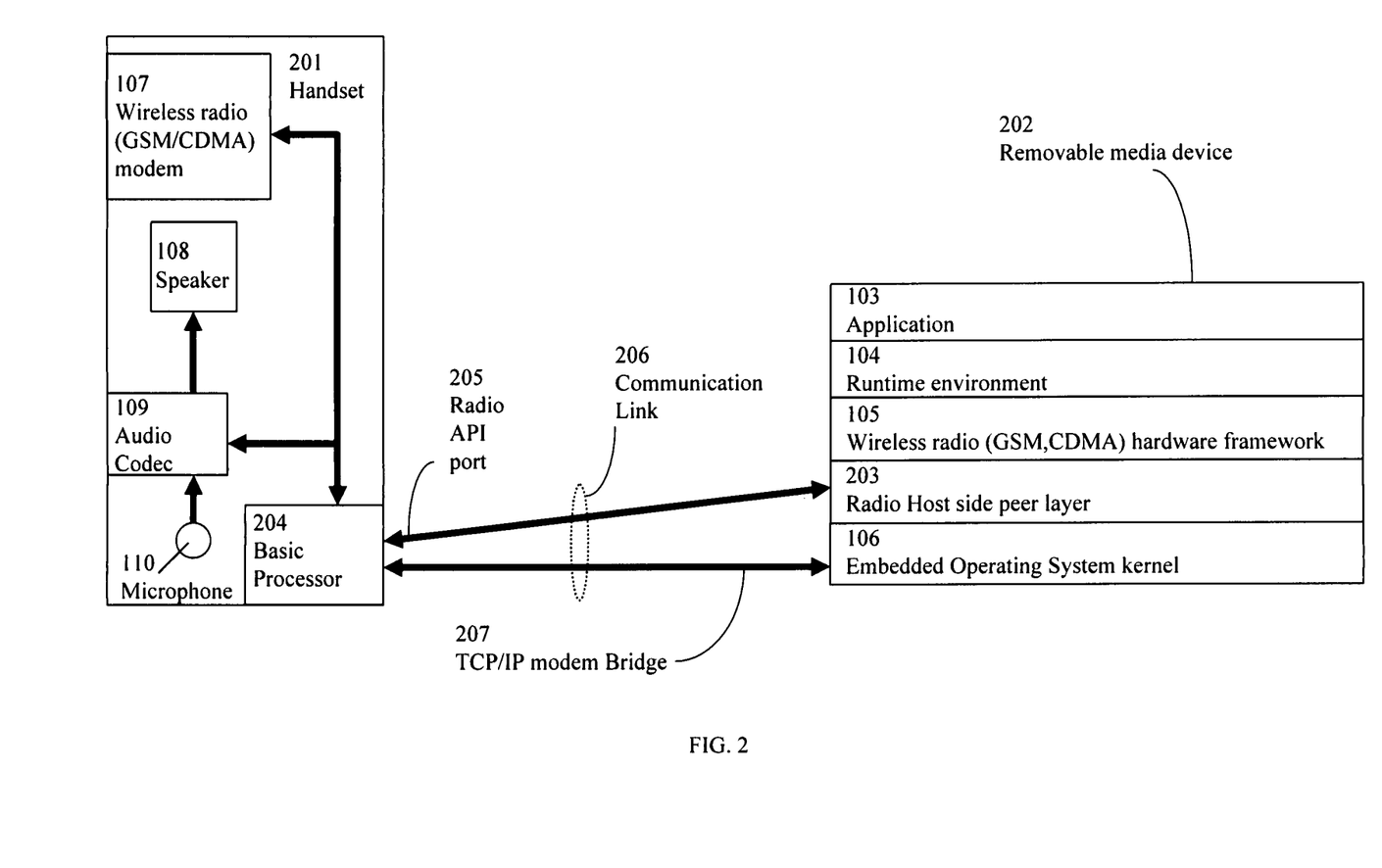
FIG. 2 illustrates a radio modem control block diagram for a processor in a removable media device according to one aspect of the system and method of the present disclosure.

As shown in FIG. 2, one aspect of the present invention may include a radio host side peer layer 203 located on the removable media device 202 under the wireless radio hardware framework layer 105. Further aspects may include a removable media device 202 conforming to the SD, micro SD, SIM, MMC, or SAM form factors. Other aspects may include wireless radio hardware conforming to the GSM or CDMA standards. The wireless device 201 may implement a radio API 205 that maps the command to the GSM or CDMA hardware. The radio API 205 may virtually map the GSM or CDMA hardware device on the wireless handset to the processor that is on the removable media device 202. The radio API 205 is a special wrapper routine that may add additional information to the standard AT command for wireless modem hardware 107 over a communication link 206. Other aspects may include an embedded OS 106 running on the removable media device.

Figure 5:
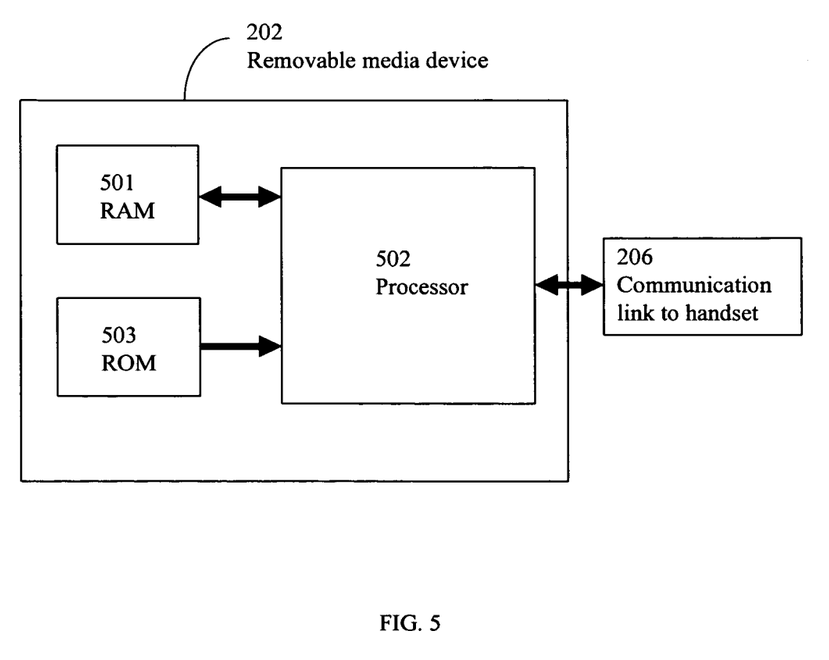
FIG. 5 illustrates a block diagram of the removable media device hardware design.

FIG. 5 illustrates a block diagram of the removable media device hardware design. One aspect of a removable media device 202 may include a processor 502 with RAM 501, ROM 503, and a communication link 206.

In one aspect, the main processor functions of the handset 201 may be relocated to removable media device 202. This removable media device 202 may be connected to the main handset 201 via a communication link 206. In the wireless device 201, the wireless radio 107 may be controlled by a basic processor 204 in the handset 201 that implements a radio API 205. The basic processor 204 in the handset may be connected by a communication link 206 to the main processor 502 in the removable media 202 where the user interface and the application 103 are operating. A radio host side peer layer 203 implemented under the hardware control framework 105 may enable a runtime environment 104 or an application 103 to be executed on the removable media 202 as if each were executed on the main processor 204 in the wireless handset 201. The radio host side peer layer 203 may map the hardware from the wireless handset 201 using the radio API 205. The radio API 205 may include the radio equipment and network error standard definitions for error handling sequences. The radio host side peer layer 203 may act as a virtual hardware device. The radio host side peer layer 203 may receive hardware commands from the device driver and put a TCP/IP wrapper over the hardware command. The radio host side peer layer 203 may then send the TCP/IP-wrapped hardware command to the radio API 205 on the handset side. The radio API 205 may remove the TCP/IP wrapper and send the command to the hardware device 107 in the wireless handset 201. During the boot up sequence, the radio host peer layer 203 may negotiate with the radio API 205 on the handset 201 side to determine what devices are supported and what device driver to install in the removable media device 202. During negotiation, the radio API 205 on the handset 201 may communicate to the host peer layer 203 what hardware and functionality the handset 201 is equipped with. The radio host peer layer 203 may then load the appropriate drivers on the removable media device 202, corresponding to the hardware configuration of the handset.

In one aspect, registering the handset 201 with the network or getting network information from the radio hardware 107 may be accomplished by the runtime environment 104 in the removable media device 202 by sending a command to the radio host peer layer 203 that communicates through a radio API 205 using a logical port on a communication link 206 to the basic processor 204 on the wireless handset 201. In one aspect, the communication link 206 may be a bus, such as USB. In other aspects, the communication link 206 may be a wireless connection. In further aspects, the communication link 206 may be a high-speed bus. Further aspects include, but are not limited to USB, SD, micro SD, SIM, SAM, and MMC as a communication link 206. This API 205 may translate the command into a command to the wireless radio modem hardware 107 to register or get network information. The reply may be sent back to the API logical port and back to the radio host peer layer 203 and up the software layer with the reply.

Making voice phone calls from an application 103 running on the removable media device 202 may be accomplished by appending the number to call on the command to be sent to the radio host peer layer 203 that communicate through a radio API 205 using a logical port 207 on the communication link 206 to the basic controller on the wireless handset 201. This API 205 may translate the command to a command to the wireless radio modem hardware 107 to make a call to that number. If successful, the voice channel to the speaker 108 and microphone 110 may be routed by the audio codec 109 to link to the wireless radio modem 107. A success or failure message may be sent back to the API logical port 205 and back to the radio host peer layer 203 and up the software layer that is asking for the service. To terminate the call, the application 103 may send a radio API 205 command through the same path to terminate the radio call. In another aspect, when making a call, the handset 201 may behave as a device or slave to the removable media device 202, but the handset 201 may still need to execute the radio API program 205 or monitor the radio hardware 107 for incoming calls or SMS messages. In other aspects, a handset 201 may still contain a basic processor 204 or baseband processor to handle real-time processes such as monitoring the network and relaying commands from the radio API 205 to the remote processes.

In another aspect, sending SMS messages may be similar to making a call where a radio API 205 for SMS is sent to the wireless handset basic processor 204 with the number to send and the message payload. The radio API 205 may reply to the application with a success or an error code.

Figure 3A:
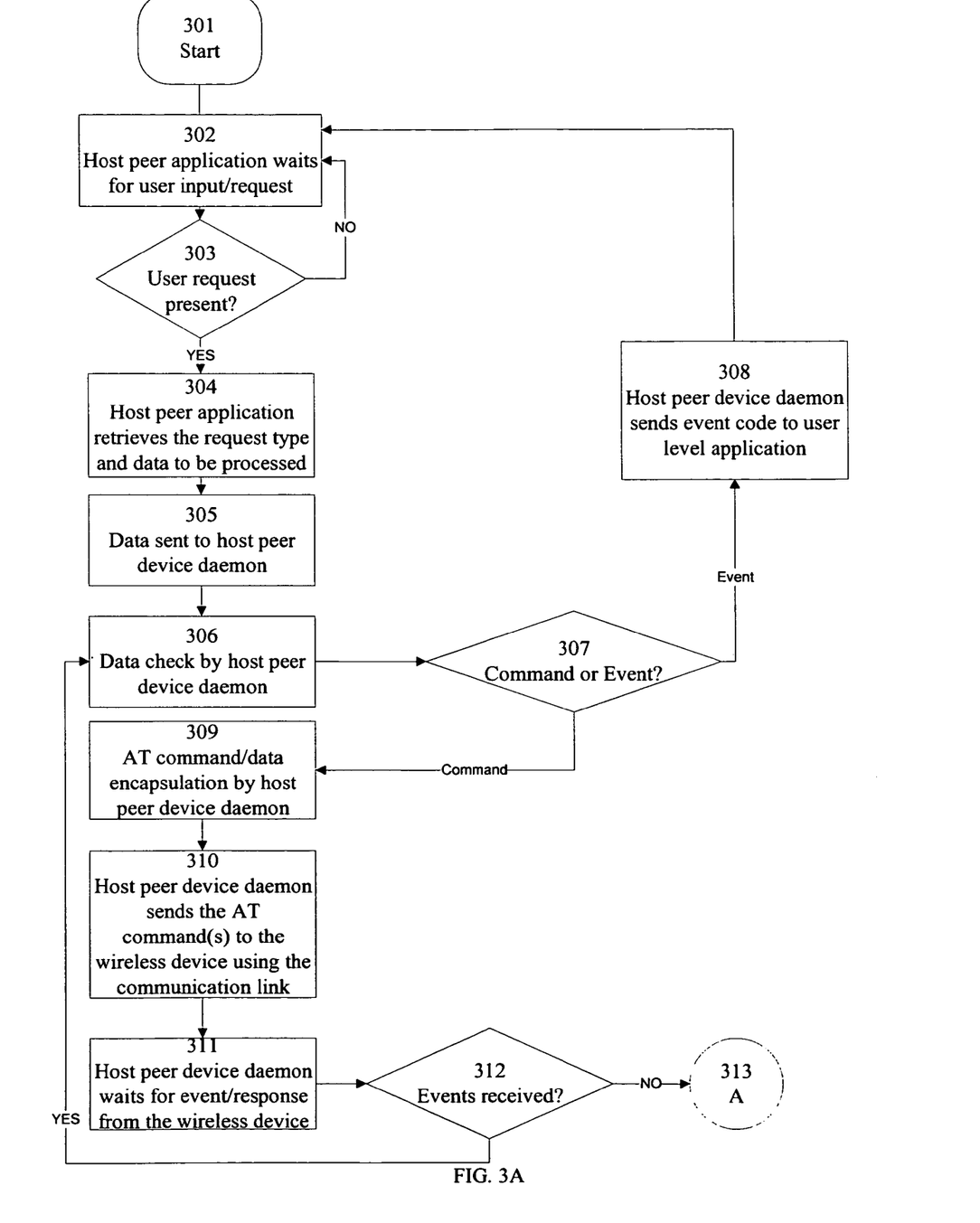
FIG. 3A illustrates a flow chart for the host peer radio API according to one aspect of the system and method of the present disclosure.
Figure 3B:
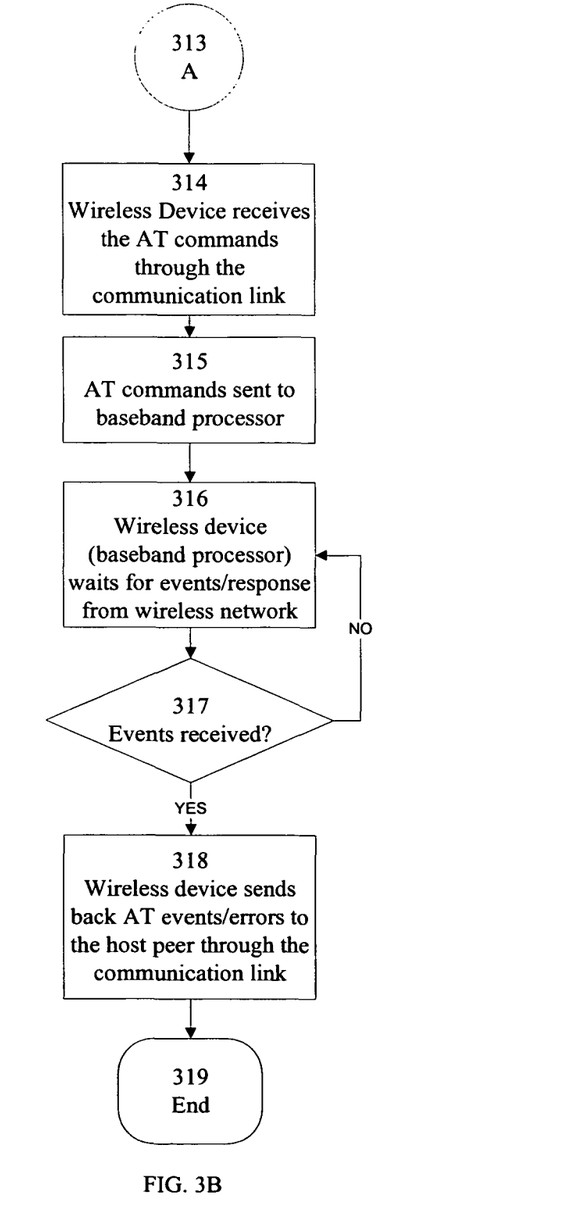
FIG. 3B illustrates an SMS flow chart for the host peer radio API for SMS messages according to one aspect of the system and method of the present disclosure.

According to one aspect, the flow charts in FIG. 3A and FIG. 3B illustrate the process of sending an SMS message. First, the process starts 301 and a host peer application waits for a user input or request 302. If such a request is present 303, the host peer application retrieves the request type and any data to be processed 304. Next, the data is sent to the host peer device daemon 305. The host peer device daemon checks the data 306 to determine whether it is a command or an event 307. If the data is an event, the host peer device daemon sends an event code back to the host peer application 308. If the data is a command, the host peer device daemon encapsulates the AT command and data to be forwarded 309. Next, the host peer device daemon sends the encapsulated AT command and data to the handset via a communication link 310. Then the host peer device daemon waits for an event or response from the handset 311. If an event is received from the handset 312, the host peer device daemon returns to check more data being received from the host peer application. If an event is not received 313, the handset receives the encapsulated AT command and data via the communication link 314. Next, the handset sends the AT command to the baseband processor 315. The baseband processor then waits for an event or response from a wireless network 316. If an event is not received 317, it continues waiting for an event. If an event is received, the baseband processor sends back AT events or errors to the host peer application through the communication link 318. The process to send an SMS message is now completed 319.

Accessing HSPDA or GPRS networks may be accomplished by sending a radio API command to set up a internet network. Once that network is made, the basic controller in the handset 204 may set up a TCP/IP network bridge 207 that connects the OS 106 on the removable media device 202 to the internet via the TCP/IP bridge 207 to the wireless radio modem 107. The OS 106 on the removable media device 202 may treat the wireless radio modem 107 as a modem device. Web Browser and internet applications may then make use of this service.

Figure 4:
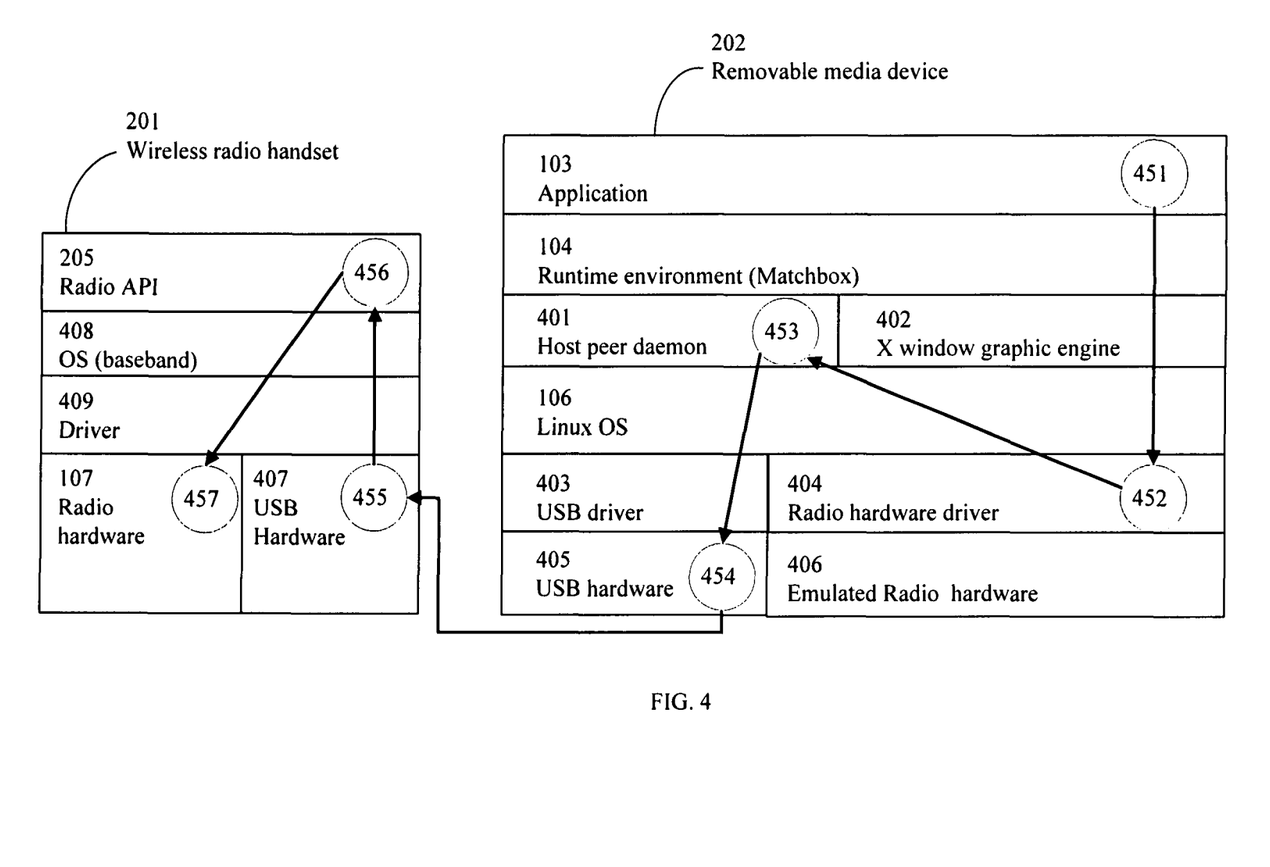
FIG. 4 illustrates a host processor and wireless radio handset according to one aspect of the system and method of the present disclosure.

FIG. 4 shows an implementation of the removable media device 202 and the wireless radio handset 201.

In one aspect, an OpenMoko Neo Free Runner handset may be used, though any hardware configuration is possible. In further aspects, handset applications and the runtime environment may be removed and replaced with the radio API 205. In other aspects, a Samsung S3C2443 development board may be used as the removable media device 202.

In another aspect, Linux may be chosen as an open source operating system 106. Other operating systems available may include, but are not limited or restricted to Win CE, Symbian or any other embedded operating system. Another aspect may include X Window, but any other graphic system may be used 402. Another aspect may include MatchBox as a runtime environment, but any runtime environment such as Android, QT, MontaVista, Openmoko, or any other runtime environment may be used 104.

In one aspect, the radio hardware 107 may not be present in the removable media device 202; instead, the radio driver 404 may pass the radio command to the host peer API or a daemon 401. In further aspects, the radio driver 404 may control virtual hardware 406 using the radio API 205 in the remote handset 201. The wireless radio handset 201 may include an OS 408 and a driver 409. The removable media device 202 may have a USB driver 403. The flow of information from an application 103 that requires access to the radio hardware 107 is depicted by the arrow and the sequence in the numbered bubble shown in FIG. 4. The sequence is as follows, including when a SMS application sends out an SMS message:

The user may complete the SMS message and may execute the send command, the application may send the AT command with data to the radio device driver software, as shown by 451.

The radio driver software driver on the removable media device may not have wireless modem hardware. Instead of sending directly to the hardware, the radio driver software may send the command to the host peer API or daemon software, as shown by 452.

The host peer API may encapsulate the command and data into a TCP/IP packet and may send the packet to the communication link, as shown by 453.

The removable media device may function as though the wireless handset is a CDC RNDIS/ethernet device and may send the TCP/IP packet to the wireless handset at a certain port number, as shown by 454.

The wireless handset may receive the packet and may send the packet to the radio API running on the wireless handset baseband processor, as shown by 455.

The radio API on the wireless handset may listen to the TCP/IP at a certain port number. Once the packet is received, the radio API may remove the AT command and data from the packet, as shown by 456. As there may be differences in AT commands for different radio hardware, the radio API may check if this command is directly supported by this radio hardware and performs the necessary command changes if it supports the hardware command set. Thus, different hardware configurations may still work because the radio API performs the compatibility changes with the AT command.

As shown by 457, the wireless radio modem hardware may receive the command and may execute an error code and may return the error code to the calling application through the reverse order of information flow (e.g., step 457 back to step 451).

Advantages of embodiments of the present invention may include one or more of the following: (1) the cost of handset may be lower and may require shorter development time because the handset only requires implementing the radio API with a lower performance processor; (2) the user interface, runtime environment and applications may not need to be developed for the handset because they may already be implemented in the removable media device.

In another aspect, the applications and runtime environment can be run on any handset that implements the radio API. In further aspects, the applications and runtime environment are portable across all handsets implementing the radio API without changes to their code.

In one aspect, all the application and data stored in the removable media device is portable and will run on any handset that implement the radio API. In further aspects, the user may preserve their applications and data even if when transferring the removable media device to a handset with a different hardware design, as long as the radio API is implemented.

Although illustrative embodiments have been shown and described herein in detail, it should be noted and will be appreciated by those skilled in the art that there may be numerous variations and other embodiments that may be equivalent to those explicitly shown and described. For example, the scope of the present invention is not necessarily limited in all cases to execution of the aforementioned steps in the order discussed. Unless otherwise specifically stated, terms and expressions have been used herein as terms of description, not of limitation. Accordingly, the invention is not to be limited by the specific illustrated and described embodiments (or the terms or expressions used to describe them) but only by the scope of claims.

The invention claimed is:

1. A system for operating the radio hardware of a wireless device, from a media device comprising:
    a wireless device, including:
        a means for processing,
        a means for storing coupled to said means for processing,
        a means for transmitting and receiving radio signals coupled to said processing means;
        a means for mapping a processor of the media device so the means for transmitting and receiving radio signals operates as if directly connected to said processor, via a radio API; and
        a means for unwrapping hardware commands, said commands comprising either a) a number and a payload, or b) a command to set up an internet network, adapted to run on said means for storing and said means for processing, adapted to communicate with said means for transmitting and receiving radio signals of said wireless device, and adapted to communicate with the media device;
    wherein said wireless device is configured to run a daemon program on said radio API.

2. The system of claim 1, wherein said hardware commands correspond to a voice call.

3. The system of claim 1, wherein said hardware commands correspond to an SMS message.

4. A system for operating the radio hardware of a wireless device, from a media device comprising:
    a media device, including:
        a means for processing,
        a means for storing coupled to said means for processing,
        a means for emulating radio hardware, adapted to run on said means for storing and said means for processing, and adapted to communicate with the radio hardware of said wireless device; and
        a means for mapping, by a radio host side peer layer on the media device, the radio hardware of the wireless device to an emulated hardware interface so the media device operates as if directly connected to said radio hardware;
    said means for emulating said radio hardware further comprising running a daemon program on said radio host side peer layer.

5. The system of claim 4, wherein said media device is removably coupled to the wireless device.

6. The system of claim 5, wherein said media device is mechanically connected to the wireless device.

7. The system of claim 5, wherein said media device adheres to a SIM, SAM, SD, micro SD, or USB dongle form factor.

8. The system of claim 4, wherein said hardware commands correspond to a voice call.

9. The system of claim 4, wherein said hardware commands correspond to an SMS message.

10. A system for operating the radio hardware of a wireless device, from a media device comprising:
   a wireless device, including:
      a first means for processing,
      a first means for storing coupled to said first means for processing,
      a means for transmitting and receiving radio signals coupled to said first processing means, and
      a means for unwrapping hardware commands, said commands comprising either a) a number and a payload, or b) a command to set up an internet network, adapted to run on said first storing means and said first processing means, and adapted to communicate with said means for transmitting and receiving radio signals of said wireless device;
      wherein said wireless device is configured to run a daemon program on a radio API; and
   a media device, including:
      a second means for processing,
      a second means for storing coupled to said second means for processing,
      a means for emulating radio hardware, adapted to run on said second means for storing and said second means for processing;
      said means for unwrapping hardware commands of the wireless device adapted to communicate with said means for emulating radio hardware of the media device, and said means for emulating radio hardware of the media device adapted to communicate with said means for unwrapping hardware commands of the wireless device;
      a means for running a daemon program on said radio host side peer layer;
   said wireless device further including a means for mapping the second means for processing of the media device so said means for transmitting and receiving radio signals operates as if directly connected to said processor, via said radio API; and
   said media device further including a means for mapping, by a radio host side peer layer on the media device, said means for transmitting and receiving radio signals of the wireless device to an emulated hardware interface so the media device operates as if directly connected to said radio hardware.

11. The system of claim 10, wherein said media device is removably coupled to the wireless device.

12. The system of claim 11, wherein said media device is mechanically connected to the wireless device.

13. The system of claim 11, wherein said media device adheres to a SIM, SAM, SD, micro SD, or USB dongle form factor.

14. The system of claim 10, wherein said hardware commands correspond to a voice call.

15. The system of claim 10, wherein said hardware commands correspond to an SMS message.

16. A method for operating the radio hardware of a wireless device from a media device comprising:
   a. mapping, on the wireless device, a processor of the media device, via a radio API;
   b. receiving, on the wireless device, wrapped packets containing radio hardware commands, said commands comprising either a) a number and a payload, or b) a command to set up an internet network, from the media device;
   c. unwrapping, on the wireless device, wrapped packets containing radio hardware commands;
   d. executing, by the radio hardware on the wireless device, said radio hardware commands; and
   e. running a daemon program on said radio API.

17. The method of claim 16, further including the step of communicating, by said radio API, with a radio host side peer layer of the media device.

18. The method of claim 17, wherein said communicating step further includes communicating with the media device through a communication link.

19. The method of claim 18, wherein said communicating step further includes communicating through said radio API.

20. The method of claim 18, wherein said communication link is a data bus.

21. The method of claim 18, wherein said communication link is wireless.

22. The method of claim 16, further including the step of transmitting, from the wireless device, data for one or more configuration settings of the radio hardware to the media device.

23. The method of claim 16, wherein the executing step is performed by the radio hardware of the wireless device.

24. The system of claim 16, wherein said hardware commands correspond to a voice call.

25. The system of claim 16, wherein said hardware commands correspond to an SMS message.

26. A method for operating the radio hardware of a wireless device from a media device comprising:
   a. emulating, on the media device, a hardware interface for communicating with a runtime environment;
   b. mapping, by a radio host side peer layer on the media device, the radio hardware of the wireless device to the emulated hardware interface so the media devices operates as if directly connected to radio hardware;
   c. wrapping, by a radio host side peer layer on the media device, radio hardware commands, said commands comprising either a) a number and a payload, or b) a command to set up an internet network;
   d. sending, by a radio host side peer layer on the media device, the wrapped radio hardware commands to the wireless device;
   e. executing commands on the media device as if the radio hardware of the wireless device is directly connected to the media device; and
   f. running a daemon program on said radio host side peer layer.

27. The method of claim 26, wherein said media device is removably coupled to the wireless device.

28. The method of claim 27, wherein said media device is mechanically connected to the wireless device.

29. The method of claim 27, wherein said media device adheres to a SIM, SAM, SD, micro SD, or USB dongle form factor.

30. The method of claim 26, wherein said media device is a removable media card.

31. The method of claim 26, further including the step of communicating with the radio hardware of the wireless device by a communication link.

32. The method of claim 31, wherein said communicating step further includes communicating through said radio host side peer layer.

33. The method of claim 31, wherein the communication link is a data bus.

34. The method of claim 31, wherein the communication link is wireless.

35. The method of claim 26, wherein said communicating step further includes communicating with the radio hardware of the wireless device using an application layer protocol.

36. The method of claim 26, further including the step of transmitting radio hardware command data to the wireless device for operating the radio hardware of the wireless device.

37. The method of claim 26, further including the step of transmitting, from the media device to the wireless device, one or more radio hardware settings for the radio hardware of the wireless device.

38. The method of claim 37, wherein said radio hardware settings include a setting corresponding to frequency, channel, or power.

39. The method of claim 26, wherein the executing step is performed by a processor of the media device.

40. The system of claim 26, wherein said hardware commands correspond to a voice call.

41. The system of claim 26, wherein said hardware commands correspond to an SMS message.

42. A method for operating the radio hardware of a wireless device from a media device comprising:
 a. emulating, on the media device, a hardware interface for communicating with a runtime environment;
 b. mapping, by a radio host side peer layer on the media device, the radio hardware of the wireless device to the emulated hardware interface so the media devices operates as if directly connected to radio hardware;
 c. wrapping, by a radio host side peer layer on the media device, radio hardware commands, said commands comprising either a) a number and a payload, or b) a command to set up an internet network;
 d. sending, by a radio host side peer layer on the media device, the wrapped radio hardware commands to the wireless device;
 e. running, on said media device, a daemon program on said radio host side peer layer;
 f. mapping, on the wireless device, a processor of the media device so the radio hardware operates as if directly connected to said processor, via a radio API;
 g. receiving, on the wireless device, wrapped packets containing radio hardware commands from the media device;
 h. unwrapping, on the wireless device, wrapped packets containing radio hardware commands;
 i. executing, by the wireless device, said radio hardware commands; and
 j. running, on said wireless device, a daemon program on said radio API.

43. The method of claim 42, further including the step of communicating between the wireless device and the media device through a communication link.

44. The method of claim 43, wherein said communicating step further includes communicating with the media device through the radio API.

45. The method of claim 43, wherein said communication link is a data bus.

46. The method of claim 43, wherein said communication link is wireless.

47. The method of claim 42, further including the step of transmitting, on the wireless device, data for configuring one or more settings of the radio hardware to the media device.

48. The method of claim 42, wherein said media device is removably coupled to the wireless device.

49. The method of claim 48, wherein said media device is mechanically connected to the wireless device.

50. The method of claim 49, wherein said media device adheres to a SIM, SAM, SD, micro SD, or USB dongle form factor.

51. The method of claim 42, wherein said media device is a removable media card.

52. The method of claim 42, wherein said communicating step further includes communicating from the media device to the wireless device through the radio host side peer layer.

53. The method of claim 42, wherein said communicating step further includes communicating by the media device with the radio hardware of the wireless device using an application layer protocol.

54. The method of claim 42, further including the step of transmitting, from the media device to the wireless device, one or more radio hardware settings for the radio hardware of the wireless device.

55. The method of claim 54, wherein said radio hardware settings include a setting corresponding to frequency, channel, or power.

56. The method of claim 42, wherein the executing step is performed by the radio hardware of the wireless device.

57. The method of claim 42, wherein the executing step further includes executing said radio hardware commands on the media device as if the radio hardware of the wireless device is directly connected to the media device.

58. The system of claim 42, wherein said hardware commands correspond to a voice call.

59. The system of claim 42, wherein said hardware commands correspond to an SMS message.

* * * * *